United States Patent Office 3,461,165
Patented Aug. 12, 1969

3,461,165
ORTHO SUBSTITUTED TRIARYL TERTIARY AMINES
Cecil L. Frye, Midland, Mich., assignor to Dow Corning Corporation, Midland, Mich., a corporation of Michigan
No Drawing. Filed Feb. 11, 1966, Ser. No. 526,721
Int. Cl. C07c *87/50, 87/64*
U.S. Cl. 260—571
10 Claims

ABSTRACT OF THE DISCLOSURE

Tertiary amines of the formulae $R_3N$ and $$R_2N\text{—}R'\text{—}NR_2$$

in which each R is an aryl or substituted aryl radical and R' is an arylene or substituted arylene radical, and all of the R and R' radicals have a hydroxy or alkoxy substituent ortho to the tertiary nitrogen atoms, are disclosed. These compounds can be used as antioxidants, chelating agents and for making thermally stable polymers.

---

This invention relates to ortho substituted triaryl amines. More specifically, this invention relates to amines of the formula $R_3N$ wherein each R is independently selected from the group consisting of aryl and substituted aryl radicals, all of the R radicals having a hydroxy or alkoxy substituent ortho to the tertiary nitrogen atom. This invention further relates to amines of the formula $R_2N\text{—}R'\text{—}NR_2$ wherein R is as defined above, R' is selected from the group consisting of arylene and substituted arylene radicals, all of the R and R' radicals having a hydroxy or alkoxy substituent ortho to the tertiary nitrogen atoms.

The amines of this invention are prepared by heating a primary aryl amine with an aryl iodide or bromide in a suitable solvent in the presence of spongy copper and potassium carbonate. By way of illustration, the $R_3N$ amines can be prepared according to the reaction

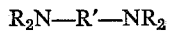

$$RNH_2 + 2RI \rightarrow R_3N$$

while the $R_2N\text{—}R'\text{—}NR_2$ amines can be prepared according to the reaction $$H_2N\text{—}R'\text{—}NH_2 + 4RI \rightarrow R_2N\text{—}R'\text{—}NR_2$$

These reactions and the preparation of the amines of this invention are described in detail in the examples.

The amines of this invention have many uses which will be obvious to those skilled in the art. For example, they can be used as antioxidants, chelating agents and for making thermally stable polymers, depending of course on the exact nature of the substituents on the aryl radicals. They are of particular interest for the latter two uses which are described in detail in my copending U.S. patent application Ser. No. 526,714, filed concurrently herewith on February 11, 1966, and entitled "Extracoordinate Metal Complexes And Polymers Thereof." The disclosure of the foregoing application is incorporated herein by reference.

As defined above, the compounds of this invention are ortho substituted triaryl amines with each R and R' group containing hydroxy and/or alkoxy groups (methoxy, ethoxy, propoxy, butoxy, octoxy, dodecoxy or octadecoxy for example) ortho to the tertiary nitrogen atoms. These ortho substituents can be the only ones present or, there can be other substituents present on the aryl or arylene groups in any of the remaining positions. By way of illustration, the basic aryl structure of R can be a phenyl, naphthyl, anthryl, xenyl or a phenanthryl radical. The basic structure of the R' arylene radicals can be the same as the R radicals listed above except they are divalent instead of being monovalent.

The substituents which can be present on the aryl and arylene radicals in addition to the essential ortho hydroxy or alkoxy group can be, for example, halogen atoms or alkyl, aryl, alkenyl, alkynyl, aralkyl, alkaryl, alkoxy, aryloxy, hydroxy, amino, carboxy, nitro, mercapto, cyano, isocyano or sulfo groups. Specific examples of substituents, in addition to the foregoing, include the fluorine, chlorine and bromine atoms, and methyl, ethyl, isopropyl, butyl, amyl, octyl, dodecyl, myricyl, phenyl, xenyl, vinyl, allyl, hexenyl, octadecenyl, ethynyl, propargyl, benzyl, 2-phenylethyl, 2-phenylpropyl, tolyl, xylyl, mesityl, methoxy, ethoxy, propoxy, phenoxy, chloromethyl, trifluoromethyl, and perfluorovinyl substituents. It should be clear to those skilled in the art that some of these aryl substituents can be present on the reactants and thus the resulting amines will contain them. However, not all of the aryl substituents are capable of withstanding the reaction conditions used in preparing the amines and hence some of them will have to be added to the amine structure after preparation employing the usual techniques that all organic chemists are familiar with. As pointed out above, those skilled in the art are familiar with the routine procedures necessary for introducing the desired substituents and the best time to do so.

Now, in order that those skilled in the art may better understand how the present invention can be practiced, the following examples are given by way of illustration and not by way of limitation.

Example 1

To a one-liter, three-necked flask fitted with a reflux condenser and Dean-Stark trap, Trubore stirrer, thermometer, and nitrogen purge line was added 64 g. (0.52 mole) of o-anisidine, 234 g. (1.0 mole) of o-iodoanisole, 300 g. of ball-milled $K_2CO_3$, 64 g. of spongy copper powder, and 200 g. of nitrobenzene. The flask was then heated at reflux for about three hours under a nitrogen purge, removing water via the Dean-Stark trap. The pot contents were then cooled and extracted with hot $HCCl_3$ several times. The combined extracts were then distilled with a Nester-Faust 36" x 10 mm. stainless steel spinning band column. The product distills at 180–200° C. at 0.4 mm. Hg and is a crystalline solid. It was recrystallized from acetone with 115 g. of product (65% yield) being obtained. The product has a melting point of 145–147° C.

The product was

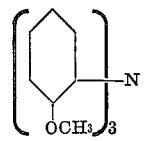

Gas-liquid chromatography (g.l.c.) showed the product to be free of contamination and the observed absence of absorption in the 2.5–3.0µ range is consistent with the above structure. The products nuclear magnetic resonance (NMR) spectrum in DCCl₃ showed a complex aromatic multiplet at 2.7–3.3τ and a singlet (CH₃O) at 6.47τ with the expected aromatic to aliphatic proton intensity ratio of 4:3. Elemental analysis of the product ($C_{21}H_{21}O_3N$) gave the following results.

Theoretical: C, 75.2%; H, 6.26%; N, 4.18%. Found: C, 75.2%; H, 6.39%; N, 3.93%.

Example 2

To a one-liter, three-necked flask fitted with a Trubore stirrer (Teflon paddle), condenser, and nitrogen purge line were added 91 g. (0.271 mole) of the product of Example 1, 500 ml. of dry toluene, and 109 g. (0.816 mole) of anhydrous AlCl₃. The addition of the AlCl₃ resulted in a vigorous exotherm as the etherate formed, depositing as a green-colored solid at the bottom of the flask. After heating at toluene reflux for 90 minutes, during which time methyl chloride was evolved, the toluene was decanted from the solid product which was then hydrolyzed with excess aqueous HCl (10%). The resultant solid was then filtered out and recrystallized from methylene chloride to give 66 g. (75% yield) of

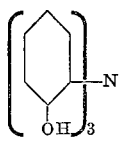

which has a melting point of 171–174° C. Alternatively, the product may be recrystallized from toluene or from methanol/water mixtures.

The infrared spectrum (hexachlorobutadiene mull) of the product confirmed the presence of OH (band at 2.95µ) and the absence of OCH₃ (no band at 3.4–3.6µ). An NMR spectrum (dimethylsulfoxide) showed a complex multiplet at 2.9–3.5τ (o-phenylene) and a singlet at 1.48τ in the anticipated aromatic to hydroxylic proton intensity ratio of 4:1.

Elemental analysis of the product ($C_{18}H_{15}O_3N$) gave the following results.

Theoretical: C, 73.7%; H, 5.12%; N, 4.78%. Found: C, 73.5%; H, 5.52%; N, 4.49%.

Example 3

Ten grams (0.042 mole) of the product of Example 1 and 15 g. (0.13 mole) of pyridine hydrochloride were heated and stirred under nitrogen at 200° C. for 90 minutes. The reaction mass was then added to water and the resulting solid was filtered out. Although insoluble in ether or chloroform, recrystallization from ethanol yielded 7.5 g. of material melting at about 230° C. This material was the impure pyridine hydrochloride adduct,

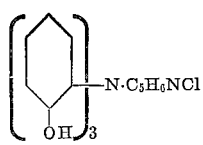

Treatment of a small portion of the adduct with aqueous KOH produced an immediate odor of pyridine. Extraction of the alkaline solution with hexane (to remove pyridine) followed by acidification with concentrated HCl produced a crystalline solid which was shown by melting point and infrared spectrum to be the anticipated triol

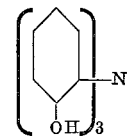

Convincing proof of the structure of this compound is provided by the extracoordinate phenyl-silicon derivative

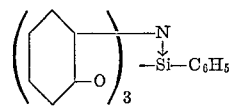

prepared as follows. A 125 ml. Erlenmeyer flask containing 2.00 g. (0.0068 mole) of the above prepared 2,2′,2″-nitrilotriphenol and 25 cc. of dry carbon tetrachloride was brought to a boil on a hot plate. To this boiling suspension there was added a solution of 2.00 g. (0.0071 mole) of phenyltriacetoxysilane in 10 cc. of carbon tetrachloride. The solution immediately became momentarily clear and then deposited the crystalline product. The product was filtered and then evacuated free of residual carbon tetrachloride and/or acetic acid, with 2.40 g. (89% yield) of the extracoordinate product being obtained. This extra-coordinate material does not melt below 300° C. but does sublime when heated strongly. Its infrared spectrum showed absorptions at 7.0µ and 14.2µ which is indicative of the phenylsilicon structure. The infrared spectrum also had strong maxima in the 10–12µ region (10.55, 10.70, 11.05 and 11.70 in chloroform) which is characteristic of the chelate cage structure in all nitrilotriphenoxysilanes. Elemental analysis of the product ($SiC_{24}H_{17}O_3N$) gave the following results.

Theoretical: Si, 7.10%; C, 72.9%; H, 4.30%; N, 3.55%. Found: Si, 7.04%; C, 72.9%; H, 4.49%; N, 3.48%.

Preparation of the extra-coordinate silicon compound also illustrates the utility of the compounds of this invention as chelating agents.

Example 4

When 2,5-dimethoxyaniline was substituted for o-anisidine in Example 1, a 63% yield of

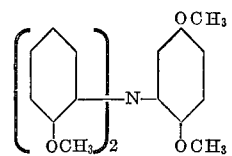

was obtained. This material was obtained as a straw-colored liquid, boiling at 185° C. at 0.3 mm. Hg, which could sometimes be induced, with difficulty, to solidify to a yellow powder which melts at about 62° C. Elemental analysis of the product ($C_{22}H_{23}O_4N$) gave the following results.

Theoretical: C, 72.4%; H, 6.30%; N, 3.84%. Found: C, 72.5%; H, 6.62%; N, 3.79%.

Example 5

To a 100 ml. distillation flask containing 10.0 g. (0.0274 mole) of the product of Example 4 and 50 ml. of dry toluene there was added 14.5 g. (0.108 mole) of AlCl₃. Etherate formation resulted in an appreciable exotherm. After heating at toluene reflux for 2 hours under nitrogen purge the solid was filtered away from toluene and washed with ethyl ether. The solid was then hydrolyzed in dilute hydrochloric acid, taken up in ether, and dried over sodium sulfate. Upon removal of the ether a brown powder remained (7 g., 80% crude yield). Recrystallization of this material from chloroform yielded 6.0 g. (68% yield) of a crystalline solid having a melting point of 172–174° C. The product was

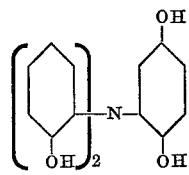

Analysis of the product showed it to contain 21.7% hydroxyl groups compared to a theoretical content of 22.0%.

Example 6

When cresidine and 3-iodo-4-methoxytoluene were substituted in the procedure of Example 1, a 30% yield of

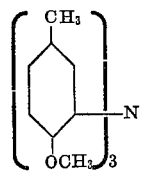

was obtained. The product had a melting point of 121–124° C. and a boiling point of 180° C. at 0.3 mm. Hg.

Example 7

Into a one-liter, three-necked flask fitted with a Dean-Stark condenser, Trubore stirrer, thermometer, and nitrogen purge line was placed 48.8 g. (0.200 mole) of 2,2'-dimethoxybenzidine, 200 g. (0.844 mole) of o-iodoanisole, 220 g. of powdered K₂CO₃, 150 g. of nitrobenzene, and 60 g. of copper powder (spongy). After heating at reflux and under nitrogen purge for three hours, an additional 50 g. of o-iodoanisole was added and reflux was continued for an additional two hours. The reaction mixture was then cooled and 300 ml. of HCCl₃ was added, causing a pink crystalline solid to form. The solids (copper, potassium salts, pink crystals, etc.) were then filtered from the resulting slurry and the filtrate discarded. The solids were then leached well with hot toluene in which the pink solid was nicely soluble. Upon concentration and cooling of this toluene solution, a pink crystalline solid again deposited. Recrystallization from chloroform yielded 97 g. of an almost colorless product (melting point 173–175° C.) containing two moles of solvated chloroform. The chloroform was readily removed by heating in a 120° C. oven to obtain the product

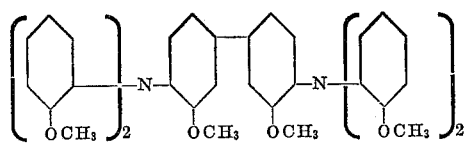

which had a melting point of 170–173° C.

Example 8

To a 500 ml. three-necked flask fitted with an air-driven Teflon paddle and a reflux condenser were added 14.2 g. (0.021 mole) of the product of Example 7 and 100 g. of toluene. The subsequent addition of 16.4 g. (0.126 mole) of AlCl₃ resulted in the exothermic formation of the insoluble etherate. After heating at reflux for two hours, during which time methylchloride was evolved, the toluene was decanted (and discarded) and the residue hydrolyzed with excess 10% HCl. The hydrolysis mixture was extracted with ether and this extract was then devolatilized on the steam bath. The residue was washed with hot HCCl₃ and then recrystallized from ethanol to obtain 8.0 g. (65% yield) of pure

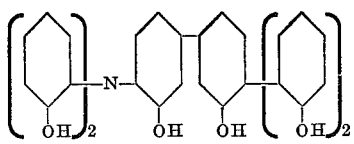

which has a melting point of 234–237° C. The infrared spectrum of this material was consistent with the structure assigned (i.e. OH band at 2.95μ and no OCH₃ band at 3.4–3.6μ). Elemental analysis of the product (C₃₈H₂₈O₆N₂) gave the following results.

Theoretical: C, 74.1%; H, 4.46%; OH, 17.8%. Found: C, 73.7%; H, 4.80%; OH, 18.2%.

Convincing proof of the structure of this compound is provided by the extra-coordinate phenyl-silicon derivative

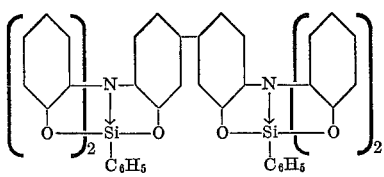

prepared as follows. A boiling solution of 2.8 g. (0.011 mole) of phenyltriacetoxysilane in 15 g. of CCl₄ was added to a boiling suspension of 2.9 g. (0.005 mole) of the above tertiary amine product in 15 g. of CCl₄. A clear solution resulted upon refluxing for several minutes. Upon cooling to room temperature, an almost quantitative yield of the anticipated extra-coordinate product (4 g.) deposited and was recrystallized from moist acetone. This extra-coordinate material does not melt below 300° C. Its infrared spectrum has bands in the 10.7–11.7μ region which is consistent with the proposed dimeric cage structure. Elemental analysis of this compound (Si₂C₄₈H₃₂O₆) gave the following results:

Theoretical: C, 73.1%; H, 4.06%; Si, 7.12%; N, 3.55%. Found: C, 72.2%, H, 4.36%; Si, 7.33%; N, 3.29%.

Preparation of the extra-coordinate silicon compound also illustrates the use of the compounds of this invention as chelating agents and in the preparation of thermally stable compounds useful at high temperatures.

Example 9

When the compounds below are substituted for the corresponding compounds in the preceding examples, the indicated products are obtained.

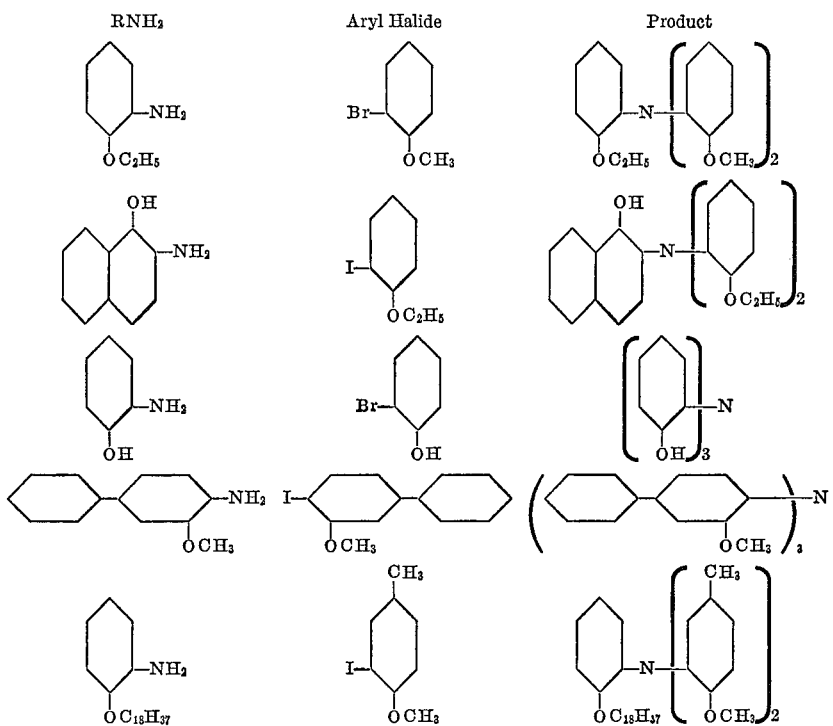

That which is claimed is:

1. Tertiary amines of the formulae R₃N and $$R_2N-R'-NR_2$$

wherein each R is independently selected from the group consisting of aryl and substituted aryl radicals, said aryl radicals being selected from the group consisting of the phenyl, naphthyl, anthryl, xenyl and phenanthryl radicals, R' is selected from the group consisting of arylene and substituted arylene radicals, said arylene radicals being selected from the group consisting of the phenylene, naphthylene, anthrylene, xenylene and phenanthrylene radicals, all of the R and R' radicals having a hydroxy substituent or alkoxy substituent containing from 1 to 18 carbon atoms ortho to the tertiary nitrogen atoms, and any substituents on the aryl and arylene radicals in addition to the hydroxy or alkoxy substituents ortho to the nitrogen atoms being selected from the group consisting of halogen atoms, alkyl groups, aryl groups, alkenyl groups, alkynyl groups, aralkyl groups, alkaryl groups, alkoxy groups, aryloxy groups, hydroxy groups, amino groups, carboxy groups, nitro groups, mercapto groups, cyano groups, isocyano groups and sulfo groups, there being no more than 30 carbon atoms in any such substituent.

2. A tertiary amine as defined in claim 1 which has the formula R₃N.

3. A tertiary amine as defined in claim 2 wherein the basic aryl structure is a phenyl ring.

4. A tertiary amine as defined in claim 3 which has the formula

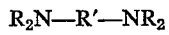

5. A tertiary amine as defined in claim 3 which has the formula

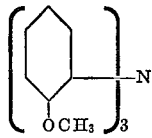

6. A tertiary amine as defined in claim 3 which has the formula

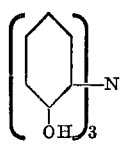

7. A tertiary amine as defined in claim 1 which has the formula R₂N—R'—NR₂.

8. A tertiary amine as defined in claim 7 wherein the basic aryl structure of each R radical is a phenyl ring.

9. A tertiary amine as defined in claim 7 which has the formula

10. A tertiary amine as defined in claim 7 which has the formula

References Cited

UNITED STATES PATENTS 3,149,933   9/1964   Ley et al. _____ 260—571

FLOYD D. HIGEL, Primary Examiner
PATRICIA C. IVES, Assistant Examiner

U.S. Cl. X.R.

252—403; 260—2, 429, 448, 453, 465, 471, 519